(12) United States Patent  (10) Patent No.: US 8,870,114 B2
Botti et al.  (45) Date of Patent: Oct. 28, 2014

(54) HYBRID DRIVE FOR HELICOPTERS

(71) Applicants: EADS Deutschland GmbH, Ottobrunn (DE); Eurocopter Deutschland GmbH, Donauwörth (DE)

(72) Inventors: Jean Botti, München (DE); Johannes Stuhlberger, Tegernsee (DE); Peter Jänker, Riemerling (DE); Valentin Klöppel, München (DE); Georg Niesl, München (DE)

(73) Assignees: EADS Deutschland GmbH (DE); Airbus Helicopters Deutschland GmbH (DE)

( * ) Notice: Subject to any disclaimer, the term of this patent is extended or adjusted under 35 U.S.C. 154(b) by 0 days.

(21) Appl. No.: 13/679,209

(22) Filed: Nov. 16, 2012

(65) Prior Publication Data

US 2013/0092789 A1  Apr. 18, 2013

Related U.S. Application Data

(63) Continuation of application No. PCT/EP2011/058123, filed on May 19, 2011.

(30) Foreign Application Priority Data

May 19, 2010  (DE) .......................... 10 2010 021 025

(51) Int. Cl.
*B64D 27/00* (2006.01)
*B64D 35/02* (2006.01)
*B64D 27/04* (2006.01)
*B64D 27/24* (2006.01)
*B64C 27/14* (2006.01)
*B64D 27/02* (2006.01)
*B64C 27/04* (2006.01)

(52) U.S. Cl.
CPC ................. *B64D 35/02* (2013.01); *Y02T 50/64* (2013.01); *Y10S 903/903* (2013.01); *B64D 2027/026* (2013.01); *B64D 27/04* (2013.01); *B64D 27/24* (2013.01); *B64C 27/04* (2013.01); *B64C 27/14* (2013.01)
USPC ............................ 244/54; 244/53 R; 903/903

(58) Field of Classification Search
USPC ................................... 903/903; 244/54, 53 R
See application file for complete search history.

(56) References Cited

U.S. PATENT DOCUMENTS 1,754,192 A   4/1930   Van Vliet
2,378,617 A   6/1945   Burke
(Continued)

FOREIGN PATENT DOCUMENTS

CH    422530 A    10/1966
CN   101628627 A    1/2010
(Continued)

OTHER PUBLICATIONS

U.S. Appl. No. 13/679,110, filed Nov. 16, 2012.
(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP (57) ABSTRACT

The rotors of a helicopter are powered by electric motors. The electrical energy required for this purpose is produced by a motor-generator unit, which comprises one or more internal combustion engines. The motor-generator unit can be secured under the cabin floor. This yields a hybrid helicopter that can set the rotational frequency of the rotors within a large interval.

12 Claims, 5 Drawing Sheets

(56) References Cited

U.S. PATENT DOCUMENTS

| | | | |
|---|---|---|---|
| 2,462,201 A | | 2/1949 | Kilgore et al. |
| 2,514,822 A | * | 7/1950 | Wolfe, Jr. .......................... 244/2 |
| 3,332,404 A | | 7/1967 | Lovercheck |
| 3,332,643 A | | 7/1967 | Toner |
| 4,554,989 A | | 11/1985 | Gruich et al. |
| 4,601,444 A | * | 7/1986 | Lindenbaum .................. 244/26 |
| 4,605,185 A | | 8/1986 | Reyes |
| 4,702,437 A | | 10/1987 | Stearns, Jr. |
| 4,703,906 A | * | 11/1987 | Eickmann .................. 244/17.23 |
| 4,953,811 A | | 9/1990 | Smith |
| 4,955,560 A | | 9/1990 | Nishina et al. |
| 5,174,523 A | | 12/1992 | Balmford |
| 5,219,143 A | | 6/1993 | Staple et al. |
| 6,171,055 B1 | | 1/2001 | Vos et al. |
| 6,568,633 B2 | | 5/2003 | Dunn |
| 6,609,378 B2 | | 8/2003 | Scott |
| 7,011,274 B1 | * | 3/2006 | Hardoin .................. 244/17.23 |
| 7,147,072 B2 | * | 12/2006 | Botti .......................... 180/65.25 |
| 7,472,863 B2 | | 1/2009 | Pak |
| 7,857,254 B2 | | 12/2010 | Parks |
| 8,056,344 B2 | * | 11/2011 | Remy et al. .................. 60/776 |
| 8,152,096 B2 | | 4/2012 | Smith |
| 8,453,962 B2 | | 6/2013 | Shaw |
| 2002/0005456 A1 | | 1/2002 | Toulmay |
| 2003/0085319 A1 | * | 5/2003 | Wagner et al. ............... 244/12.3 |
| 2003/0230671 A1 | * | 12/2003 | Dunn .......................... 244/53 R |
| 2004/0007644 A1 | * | 1/2004 | Phelps et al. ............... 244/17.11 |
| 2005/0045762 A1 | * | 3/2005 | Pham .......................... 244/7 R |
| 2006/0027701 A1 | | 2/2006 | Eglin |
| 2006/0048988 A1 | | 3/2006 | Dreibholz et al. |
| 2006/0060693 A1 | * | 3/2006 | Poltorak .................. 244/17.11 |
| 2006/0138278 A1 | | 6/2006 | Gans |
| 2006/0185356 A1 | | 8/2006 | O'Brien |
| 2006/0231676 A1 | | 10/2006 | Kusic |
| 2008/0006739 A1 | | 1/2008 | Mochida et al. |
| 2008/0035786 A1 | * | 2/2008 | Bilyk et al. .................. 244/13 |
| 2008/0145220 A1 | | 6/2008 | Yeh et al. |
| 2008/0179452 A1 | | 7/2008 | Kinkopf et al. |
| 2008/0184906 A1 | | 8/2008 | Kejha |
| 2009/0140095 A1 | | 6/2009 | Sirohi et al. |
| 2009/0145998 A1 | | 6/2009 | Salyer |
| 2009/0293494 A1 | | 12/2009 | Hoffjann et al. |
| 2010/0012223 A1 | | 1/2010 | Yoshida |
| 2010/0038473 A1 | | 2/2010 | Schneider et al. |
| 2010/0044498 A1 | | 2/2010 | Palcic et al. |
| 2010/0072318 A1 | | 3/2010 | Westenberger |
| 2010/0123039 A1 | | 5/2010 | Buhl et al. |
| 2010/0127114 A1 | | 5/2010 | Nakayama et al. |
| 2010/0230547 A1 | | 9/2010 | Tayman |
| 2011/0031355 A1 | * | 2/2011 | Alvarez ........................ 244/7 R |
| 2011/0073717 A1 | | 3/2011 | Foucault et al. |
| 2011/0108663 A1 | | 5/2011 | Westenberger |
| 2011/0147511 A1 | * | 6/2011 | Poltorak .................. 244/17.19 |
| 2012/0056040 A1 | * | 3/2012 | Brotherton-Ratcliffe et al. .......................... 244/23 A |
| 2012/0234968 A1 | * | 9/2012 | Smith .......................... 244/12.3 |
| 2012/0256042 A1 | * | 10/2012 | Altmikus et al. .......... 244/17.21 |
| 2013/0062455 A1 | * | 3/2013 | Lugg et al. .................. 244/12.3 |

FOREIGN PATENT DOCUMENTS

| | | |
|---|---|---|
| DE | 1581060 B1 | 9/1969 |
| DE | 2628274 A1 | 1/1978 |
| DE | 102004044646 A1 | 3/2006 |
| DE | 102004043589 A1 | 4/2006 |
| DE | 102005046729 A1 | 4/2007 |
| DE | 102006056354 A1 | 6/2008 |
| DE | 102006056356 A1 | 6/2008 |
| DE | 202007006976 U1 | 9/2008 |
| DE | 102007013732 A1 | 10/2008 |
| DE | 102008014404 A1 | 10/2009 |
| DE | 102008028866 A1 | 12/2009 |
| DE | 102008046486 A1 | 3/2010 |
| DE | 102008057715 A1 | 5/2010 |
| EP | 1630097 A1 | 3/2006 |
| EP | 2159903 A2 | 3/2010 |
| FR | 2931456 A1 | 11/2009 |
| GB | 2419122 A | 4/2006 |
| JP | 05193581 A | 8/1993 |
| JP | 1999-147499 | 6/1999 |
| WO | 03106259 A2 | 12/2003 |
| WO | 2006113877 A2 | 10/2006 |
| WO | 2008086774 A2 | 7/2008 |
| WO | 2008138972 A1 | 11/2008 |
| WO | 2009025231 A1 | 2/2009 |
| WO | 2009153236 A2 | 12/2009 |
| WO | 2010106343 A2 | 9/2010 |

OTHER PUBLICATIONS

U.S. Appl. No. 13/680,509, filed Nov. 19, 2012.
Chinese Office Action for Application No. 201180024796.9 dated Jun. 4, 2014 (English Summary provided.).

* cited by examiner

HYBRID DRIVE FOR HELICOPTERS

CROSS-REFERENCE TO RELATED APPLICATIONS

The present application is a continuation of International Application No. PCT/EP2011/058123, filed May 19, 2011, which claims priority from German Application No. 10 2010 021 025.0, filed May 19, 2010, the disclosures of which are incorporated herein by reference.

FIELD OF THE INVENTION

The invention relates to helicopter drives. In particular, the invention relates to a hybrid drive for a helicopter, the use of a hybrid drive in a helicopter, a hybrid helicopter as well as a method for powering a main rotor and/or a tail rotor of a helicopter.

BACKGROUND OF THE INVENTION

Contemporary helicopters often exhibit a low efficiency of the drive system. In addition, the drive is often very loud.

The drive train consists of one or more internal combustion engines and a mechanical main gear unit. Turbine shaft drives or reciprocating piston engines are frequently used.

DE 10 2008 028 866 A1 as well as WO 2009/153236 A2 describe a helicopter with a wobble plate actuator.

BRIEF SUMMARY OF THE INVENTION

An aspect of the invention provides an alternative drive for helicopters.

A first aspect of the invention indicates a hybrid drive for a helicopter, wherein the hybrid drive comprises a first motor, a second motor and a generator unit. The first motor is designed to power the generator unit, and the generator unit is designed to produce electrical energy for supplying the second motor. The second motor is an electric motor designed to power a rotor of the helicopter. For example, the rotor to be powered involves the main rotor of the helicopter or the tail rotor.

For example, the speed of the main rotor (and/or tail rotor) can be set within a large interval in this way. In this way, the highly variable speed of the rotor makes it possible to optimize the energy consumption. As a result, the performance and emission of the helicopter can be optimized. Because the rotor is directly powered, additional mechanical elements, such as a clutch or wobble plate, can be simplified in design or omitted entirely.

Another aspect of the invention indicates the use of a hybrid drive described above and below in a helicopter (chopper).

Another aspect of the invention indicates a hybrid helicopter with a hybrid drive described above and below.

Another aspect of the invention indicates a method for powering a main rotor and/or a tail rotor of a helicopter, in which a generator unit is powered by a first motor, thereby generating electrical energy to supply a second motor. In addition, at least one of the rotors of the helicopter is powered by the second motor (which is supplied with the electrical energy from the generator unit).

In one embodiment of the invention, the first motor is a Wankel rotary engine. However, it can also be another internal combustion engine (or several internal combustion engines), for example a turbine.

In another embodiment of the invention, the second motor is a low-inertia direct drive with a high power density.

Another electric motor of this kind can also be provided, so as to power an additional rotor of the helicopter. For example, the tail rotor drive and main rotor drive can be mechanically decoupled in this way.

In another embodiment of the invention, the hybrid drive comprises an energy storage device for temporarily storing the electrical energy produced by the generator unit. An arrangement of rechargeable batteries can be involved here. Other energy storage devices can also be provided.

In another embodiment of the invention, the second motor is designed for directly powering the rotor, so that no rotor gearbox is required. Mechanical elements can be eliminated in this way, making it possible to reduce upkeep and maintenance costs, and increase energy efficiency.

In another embodiment of the invention, the first motor and the generator are designed for space-saving installation, e.g., under a cabin floor of the helicopter. In this way, the center of gravity can be shifted downward, thereby elevating the stability of the helicopter on the ground (e.g., during autorotation landings). The safety of passengers during crash landings is also improved by the absence of large masses in the cabin canopy area.

In another embodiment of the invention, the hybrid drive further comprises a mounting device for hinging the second motor to a helicopter cell or another supporting structure of the helicopter, so that the second motor along with the main rotor of the helicopter can be pivoted relative to the helicopter cell.

In another embodiment of the invention, the mounting device is designed as a tilting mounting device with a tilting bearing and tilting actuator. This makes it possible to tilt the motor and rotor together around an axis. For example, this axis can be an axis situated transverse to the longitudinal axis of the helicopter, so that the motor and rotor can be tilted toward the front and back.

In another embodiment of the invention, the hybrid drive comprises a third motor in the form of an electric motor designed for directly powering a tail rotor of the helicopter.

The mounting device can further be designed as a gimbaled mounting device. This makes it possible to tilt the rotor in all directions.

It can also be provided that the mounting device is designed to generate a specific oscillation mode of the electric motor in such a way that an inversely phased oscillation can be generated, which is able to extinguish an original oscillation. This makes it possible to compensate for undesired vibrations.

In another embodiment of the invention, the main rotor drive comprises an active flap controller to ameliorate vibrations of the main rotor. The active flap controller is here to be understood as the unit comprised of control electronics and a control element (flap). Accordingly, the rotor blades of the main rotor comprise servo flaps, which can be actively actuated.

In another embodiment of the invention, the first motor, the generator and the energy storage device are arranged in a space-saving manner, e.g., located under the cabin floor.

In another embodiment of the invention, not just the second motor, but also a third motor and potentially others are supplied with electrical energy by the generator unit. The motors together power one or more rotors, for example a tail rotor or a second main rotor.

In another embodiment of the invention, the second motor, which is an electric high-torque motor, along with the main rotor can be pivoted relative to the helicopter cell while the helicopter is in flight.

One core aspect of the invention can be regarded as involving the main rotor and/or the tail rotor being directly powered by a respective electric motor. In principle, this makes it possible to move the electric motor along with the corresponding rotor, for example via tilting. Provided to supply energy to the electric motor is a motor-generator unit, which for example is situated under the helicopter cell floor. The motor-generator unit comprises one or more internal combustion engines, as well as one or more generators connected thereto for producing electrical energy. An electrical energy storage device can also be provided, which temporarily stores the electrical energy produced by the generators. Since the rotors are powered by one or more electric motors, the rotor speeds can be varied within a large speed range. A mechanical clutch is not required.

Therefore, the rotors can be powered with electric high-torque motors. In one embodiment of the invention, these electric high-torque motors are low-inertia direct drives with a high power density. DE 10 2007 013 732 A1 describes one example for such a direct drive.

Embodiments of the invention will be described below with reference to the figures.

DETAILED DESCRIPTION

The depictions in the figures are schematic and not to scale.

The same reference numbers are used in the following description of figures for identical or similar elements.

Figure 1:
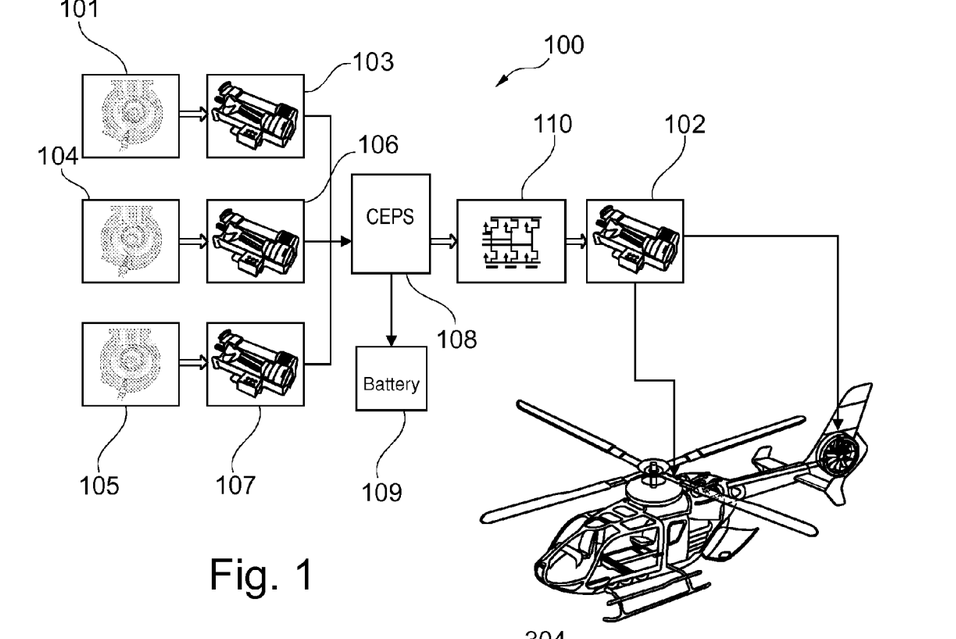
FIG. 1 shows a structural design of a hybrid drive for a helicopter according to an embodiment of the invention.

FIG. 1 shows a hybrid drive for a helicopter according to an embodiment of the invention. The hybrid drive 100 of the helicopter comprises one or more internal combustion engines (three internal combustion engines 101, 104, 105 in the embodiment on FIG. 1) and one or more electric generators (three generators 103, 106, 107 in the embodiment on FIG. 1). Each internal combustion engine releases mechanical energy to the corresponding generator, which is then converted into electrical energy. This electrical energy is then released to a central energy control system ("central electrical power system", CEPS) 108, which handles power control operations in the helicopter. As a result, the electrical energy can be released to an inverter 110, which supplies the electric motor(s) 102 with the necessary electrical energy.

An electric motor is here provided for the main rotor, and another electric motor is provided for the tail rotor.

In addition, the electrical energy produced by the generators can be released by the energy controller 108 to an electrical storage device 109, which for example can take the form of a battery array. This temporarily stored electrical energy can be used as an emergency supply for the electric motors 102 given a failure of one or more of the internal combustion engines 101, 104, 105. The temporarily stored energy can also be used to cover peaks in the demand for power by the electric motors. Since it may help save on fuel to temporarily deactivate one or more internal combustion engines during flight segments that demand little power, the stored electrical energy can also bridge the run-up period for a reactivated internal combustion engine.

As a result, the internal combustion engines 101, 104 and 105 can always run at the optimal operating point, thereby optimizing energy consumption.

Therefore, one or a plurality of internal combustion engines, which for example are compact Wankel rotary engines, are used in conjunction with generators that produce electric power and release it to the main and tail rotors equipped with electric motors. If needed, the electrical energy can be temporarily stored with a battery.

This arrangement replaces main and tail rotor gearboxes of a conventional design. Due to performance and strength considerations, these conventionally designed gearboxes often only permit a highly limited speed variation. The use of electric motors makes it possible to vary the speed within a broader range. This can lead to a diminished power demand, reduced noise and compressibility effects and an expanded flying range (flight envelope) toward a higher flight speed and load factor.

To this end, the rotor speeds can be variably controlled independently of the internal combustion engines. This can be expanded to include tail rotor shutdown during forward flight. The drag can be distinctly reduced as a result. In such a case, the yaw is controlled by way of a controllable vertical stabilizer fin.

The drive system has a high availability and reliability corresponding to the number of independent energy sources. For this purpose, the individual components are selected in such a way that they can temporarily replace failed adjacent units.

The mechanical gearbox also eliminates a number of other problem areas, including:
Leaks and foreign bodies in the oil system,
Gear wheel failure and bearing problems,
Wear and expensive maintenance work,
High outlay for pulling the mast,
Coupling problems between the drive and gearbox input, as well as compensation requirements in two-motor versions given a differing power level of the engines (so-called power split),
Diminished comfort owing to disruptive noise, in particular tonal noise components, since the gearbox represents one of the dominating noise sources in the cabin,
Threat to passengers during an accident posed by the large masses situated over the cabin, as well as
Restricted change in torque level as necessitated by the usual further development of a helicopter type toward a higher takeoff weight (upgrading), and thus:
Inhibited development of a helicopter type family.

The separation of energy generation and drive yields a significantly higher flexibility in terms of the architecture of the entire system. While conventional engines are situated as close to the gearbox as possible, only the position of the electromotor is fixed here. For example, the energy generating drive components can be integrated under the cabin floor, which can make for easier accessibility and allows the helicopter to stand more stably on the ground. By suitably shifting the energy unit (or only the energy storage device, for example) in the longitudinal and transverse direction, the location of the possible center of gravity range can be favorably selected.

Figure 2:
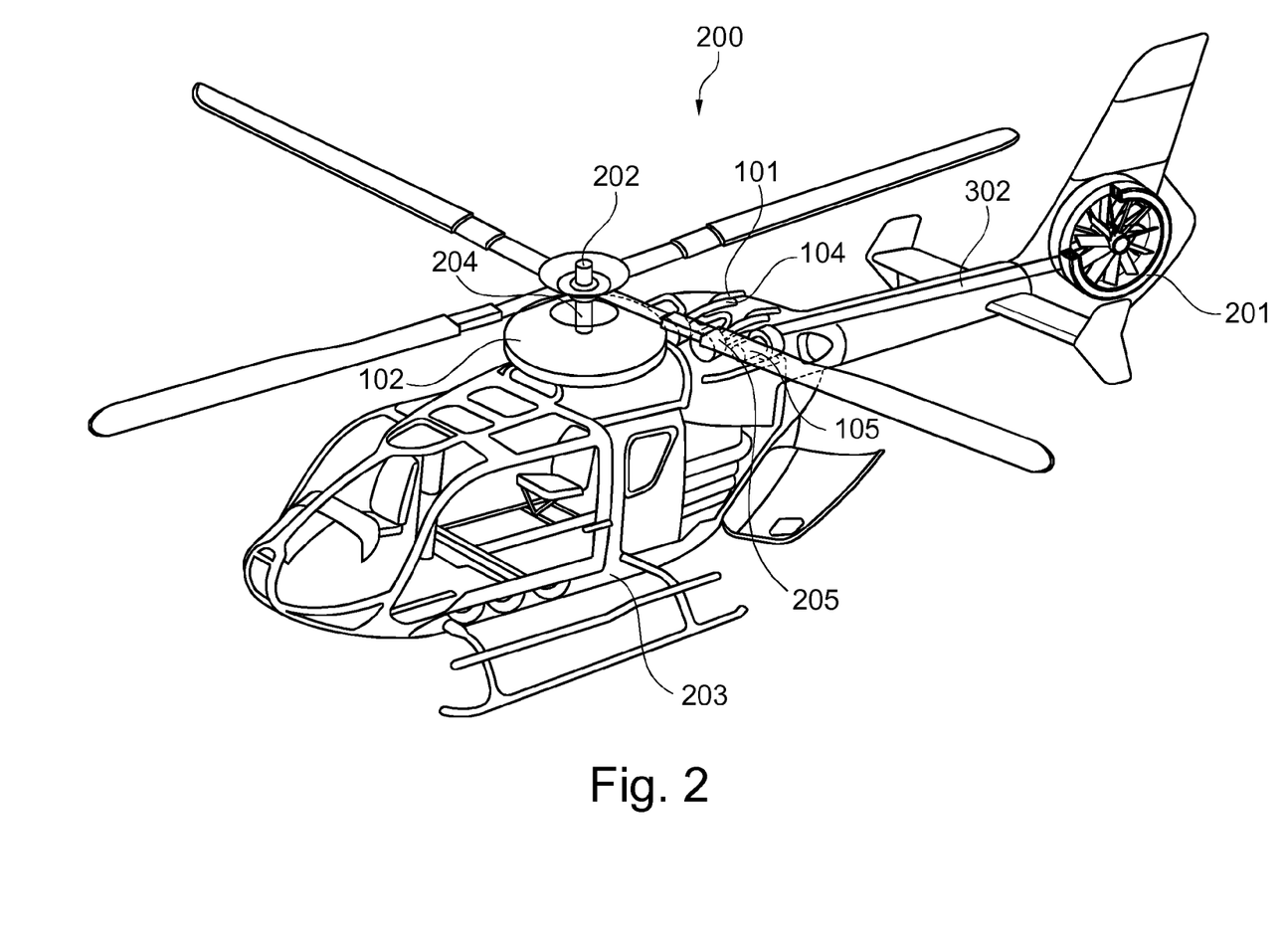
FIG. 2 shows a hybrid helicopter according to an embodiment of the invention.

FIG. 2 shows a helicopter with an electric main rotor drive 102 and an electric tail rotor drive 201.

The electric main rotor drive 102 is directly connected with the main rotor 202 via the drive axis 204. For example, the power of the electric main rotor drive is 600 kW, and has a multi-redundant design, for example in the form of a transversal flux motor (so-called "trans-flux motor").

For example, the main rotor drive 102 is attached to the supporting structure 203 of the helicopter cell via a tilting bearing.

The tail rotor drive 201 also comprises an electric motor with a power of about 200 kW, which also has a multi-redundant design, for example also in the form of a transversal flux motor.

Situated under the cabin floor or (as on FIG. 2) above the helicopter cell are several motor-generator units, four marked 101, 104, 105, 205 in the figure, which are connected with the electric motors via electrical connections. One of these electrical connections between the tail rotor drive 201 and generators is symbolized by reference number 302.

For example, the continuous power of each motor-generator unit 101, 104, 105, 205 is 133 kW, with a peak power of 166 kW.

Possible as the energy storage devices in addition to rechargeable batteries are capacitors or buffer caps, which for example can store 40 kW-hours. Depending on the motorization, this makes it possible to provide an emergency supply of several minutes.

Figure 3:
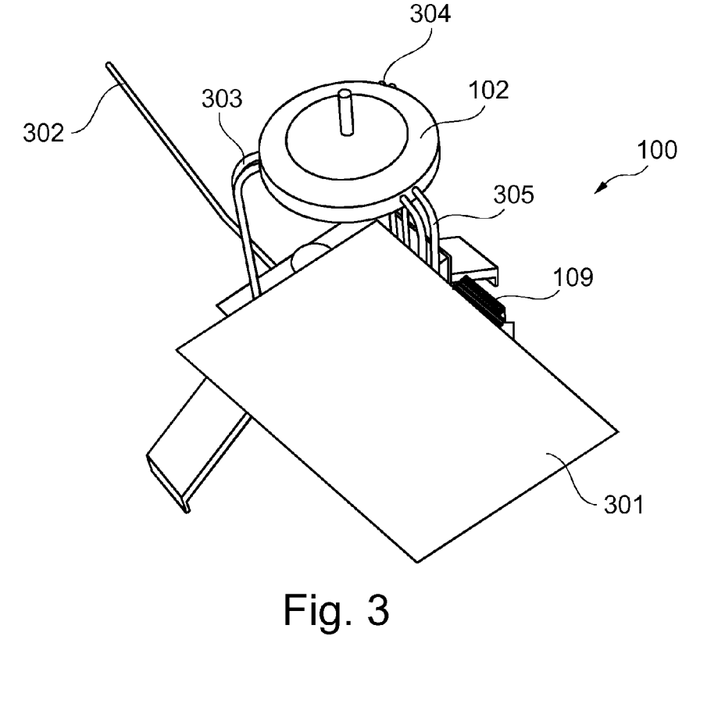
FIG. 3 shows the arrangement of system components according to an embodiment of the invention.

FIG. 3 shows a possible arrangement of system components according to an embodiment of the invention. The electric drive 102 of the main rotor is situated directly under the main rotor, and connected via electric line pairs 303, 304, 305 with the motor-generator unit under the cabin floor 301. The motor-generator unit under the cabin floor 301 is additionally connected via the line 302 with the tail rotor drive.

Therefore, the connection between the energy generator and electromotors is established by cables, which can be run along the cabin wall in a space-saving manner.

For example, the motor-generator unit exhibits four turbo-Wankel two-disk motors (turbo Wankel 2-disk motors) with an engine displacement of 336 ccm and continuous power of 133 kW, as well as a peak power of 166 kW (for about one hour). The overall weight is 40 kg.

The electric control unit 108 (see FIG. 4) can control the internal combustion engines, as well as adjust and optimize the fuel consumption and fuel combustion. The electric drives of the main and tail rotor can be made multi-redundant in design, for example by providing a plurality of stators and rotors inside the electric motors.

For example, three batteries are provided, which can store a total of 40 kW hours, e.g., utilizing Sion Power cells. The weight of the energy storage device can amount to 100 kg in all, for example.

Figure 4:
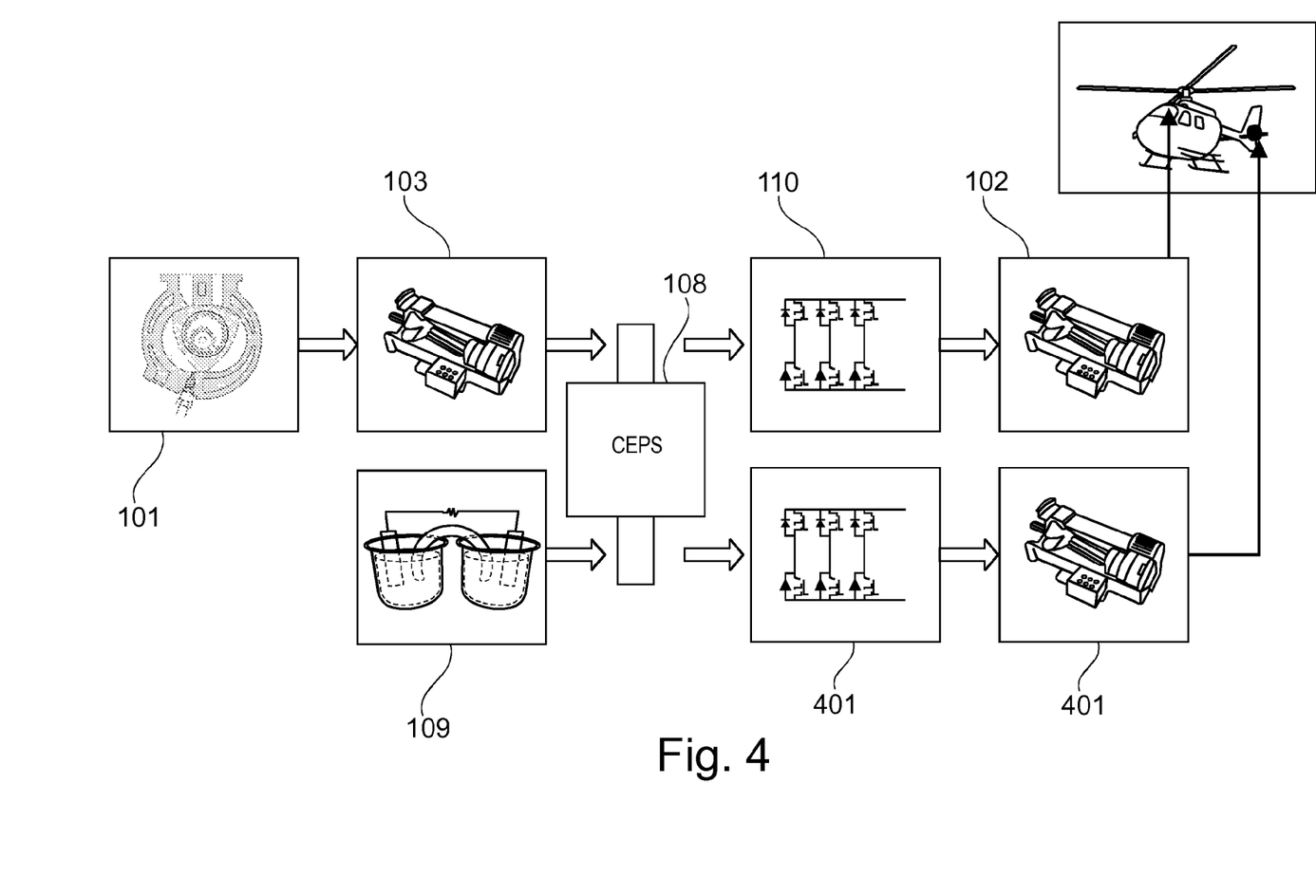
FIG. 4 shows the system architecture according to an embodiment of the invention.

FIG. 4 shows a basic system architecture for a hybrid helicopter according to an embodiment of the invention. For example, a single internal combustion engine 101 is used. The internal combustion engine 101 is connected with an electric generator 103, which in turn supplies a generated energy to a central electrical energy controller (electrical control unit) 108. This energy controller 108 is also hooked up to storage cells 109, which can be correspondingly charged and discharged. In addition, the controller 108 is connected with two inverters 110, 401, which each are hooked up to an electric motor 102, 402 for the main rotor or the tail rotor drive.

Figure 5:
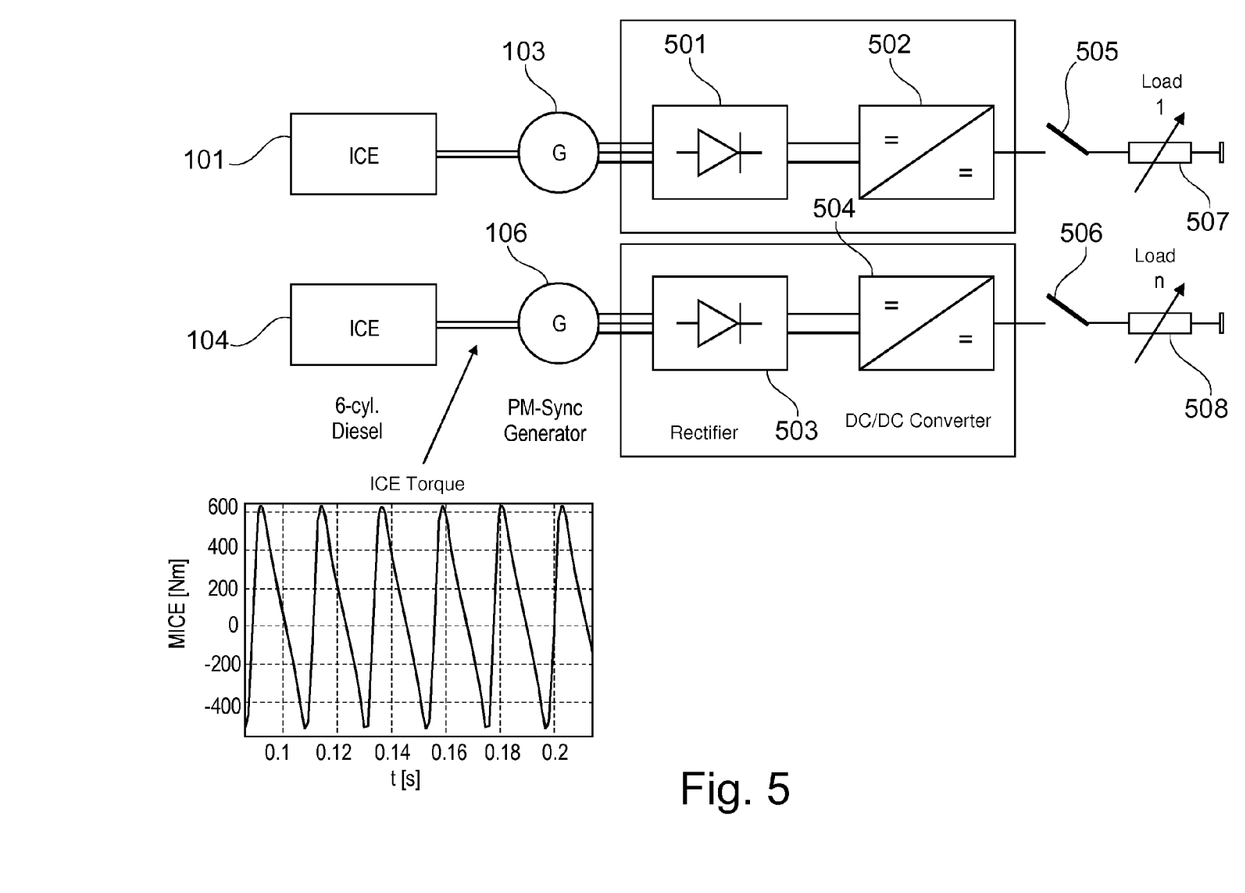
FIG. 5 shows an arrangement of system components according to an embodiment of the invention.

FIG. 5 shows an arrangement of the individual system components according to an embodiment of the invention. Provided in the case of FIG. 5 are two internal combustion engines 101, 104, which for example are 6-cylinder diesel engines. The two engines 101, 104 are connected with corresponding generators 103, 106, whose energy output is hooked up to a respective rectifier 501, 503. DC/DC converters 502, 504 are located at the rectifier outputs. Corresponding loads 507, 508 (e.g., the electric motors) can be connected to the converter outputs via the switches 505, 506.

Figure 6:
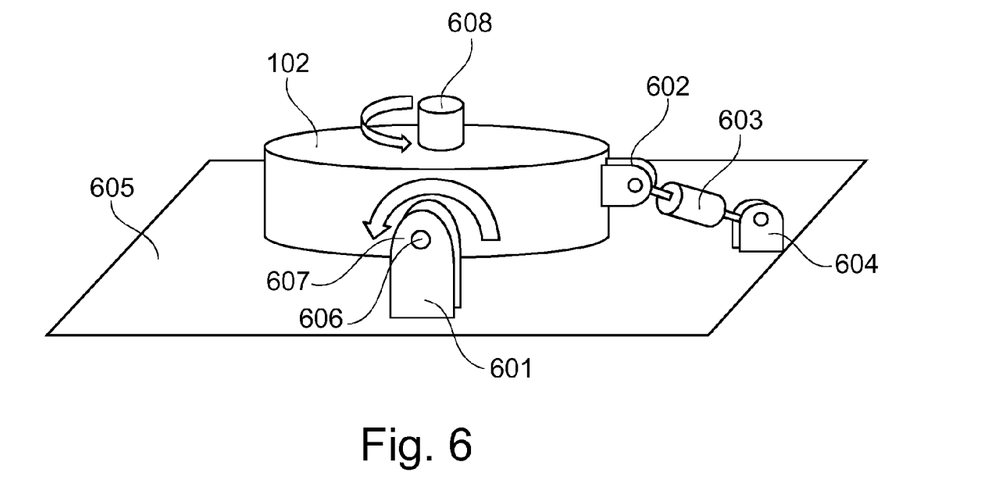
FIG. 6 shows a mounting device for a main rotor drive according to an embodiment of the invention.

FIG. 6 shows the hinged arrangement of an electric motor to the cabin canopy 605 of the helicopter. Doing away with the rigid attachment of the rotor drive to the helicopter cell makes it possible to pivot the rotor mast along with the electric motor, and hence the thrust vector, in the longitudinal direction of the helicopter as needed (i.e., around the transverse axis). As a result, the large, drag-increasing angular positioning of the fuselage normally required during forward flight can be avoided, along with the associated high blade root bending moments.

Secured to the cabin canopy 605 (part of the helicopter cell) is a tilting bearing 601, which for example consists of a transverse axis 606 and two lateral suspension brackets 607.

The electric motor 102 is suspended on the transverse axis 606, and can be tilted around this transverse axis. The rotor mast 608 is made to rotate by the electric motor 102, and is also tilted along with the electric motor 102 around the axis 606.

In order to control the tilting process, at least one tilting actuator 603 is provided, which is also connected with the cabin canopy 605 via the suspension bracket 604, and with the housing of the electric motor via the suspension bracket 602.

For example, the tilting angle moves between 0 degrees and about 15 degrees toward the front and/or back. It can be increased if needed. It is also possible to provide a gimbaled suspension bracket for the rotor/drive unit, so that the electric motor 100 along with the main rotor can be tilted in all directions.

A rudder on the elevator unit makes it possible to set the helicopter fuselage to have the least drag. The resultantly arising mast moments can be diminished by tilting the rotor forward.

Figure 7:
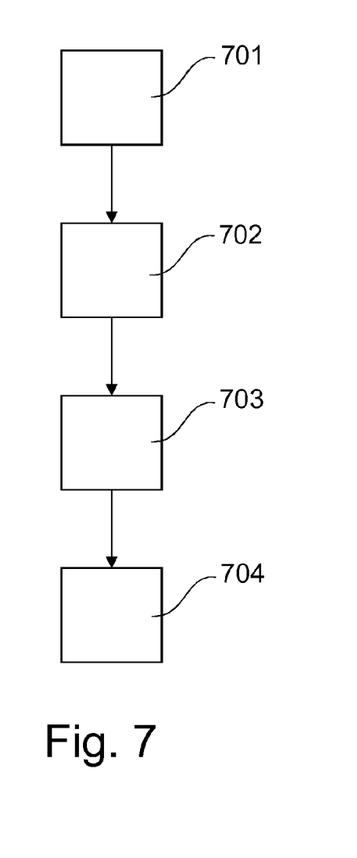
FIG. 7 shows a flowchart for a method according to an embodiment of the invention.

FIG. 7 presents a flowchart for a method according to an embodiment of the invention. A pilot initially uses control levers to command a specific flight state in step 701. In step 702, an onboard computer determines the corresponding rotor power demand, the optimal values for rotor mast inclination and rotor speed, as well as the accompanying combustion power. In step 703, the required mechanical energy is generated by operating an internal combustion engine. This mechanical energy is then converted into electrical energy by a generator in step 704. In step 705, this electrical energy (if necessary after post processing, for example rectification and/or transformation) is used to power one or more electric motors for the main rotor and/or tail rotor. In step 706, the electric motor of the main rotor is pivoted in conjunction with the main rotor at an optimized speed during the forward flight of the helicopter so as to minimize fuselage drag.

In addition, let it be noted that "encompassing" and "exhibiting" do not preclude other elements or steps, and that "an" or "a" do not rule out a plurality. Let it further be noted that features or steps that were described with reference to one of the above exemplary embodiments can also be used in combination with other features or steps from other exemplary embodiments described above. Reference signs in the claims are not to be construed as limitations.

LIST OF REFERENCE SIGNS

100 Hybrid drive
101 Internal combustion engine
102 Electric motor

103 Generator
104 Internal combustion engine
105 Internal combustion engine
106 Generator
107 Generator
108 Central energy control system
109 Energy storage unit
110 Inverter
200 Helicopter
201 Tail rotor drive
202 Main rotor
203 Helicopter cell
204 Drive axis
205 Generator
301 Cabin floor
302 Line
303 Line pair
304 Line pair
401 Inverter
402 Motor
501 Rectifier
502 Converter
503 Rectifier
504 Converter
505 Switch
506 Switch
507 Load
508 Load
601 Tilting bearing
602 Suspension bracket
603 Tilting actuator
604 Suspension bracket
605 Cabin canopy
606 Transverse axis
607 Suspension brackets
701 Procedural step
702 Procedural step
703 Procedural step
704 Procedural step
705 Procedural step
706 Procedural step

The invention claimed is:

1. A hybrid helicopter comprising:
a hybrid drive; and
a cabin floor;
wherein the hybrid drive comprises:
a first motor;
a second motor; and
a generator unit;
wherein the first motor is configured to power the generator unit;
wherein the generator unit is configured to produce electrical energy for supplying the second motor; and
wherein the second motor is an electric motor configured to power a rotor of the helicopter;
wherein the first motor and the generator unit are arranged under the cabin floor of the helicopter.

2. The hybrid helicopter of claim 1, wherein the first motor comprises a Wankel rotary engine or another internal combustion engine.

3. The hybrid helicopter of claim 1, wherein the second motor comprises a low-inertial direct drive with a high power density.

4. The hybrid helicopter of claim 1, further comprising an energy storage device for temporarily storing the electrical energy produced by the generator unit.

5. The hybrid helicopter of claim 1, wherein the second motor is configured for directly powering the rotor.

6. The hybrid helicopter of claim 1, further comprising:
a mounting device for hinging the second motor to a helicopter cell, so that the second motor along with the main rotor of the helicopter is configured to be pivoted relative to the helicopter cell.

7. The hybrid helicopter of claim 6, wherein the mounting device is configured as a tilting mounting device with a tilting bearing and a tilting actuator.

8. The hybrid helicopter of claim 1, further comprising:
a third motor comprising an electric motor and configured for directly powering a tail rotor of the helicopter.

9. The hybrid helicopter of claim 4, wherein the energy storage device is arranged under the cabin of the helicopter.

10. A method for powering a main rotor or a tail rotor of a helicopter, the method comprising:
powering a generator unit with a first motor, wherein the first motor and the generator unit are arranged under the cabin floor of the helicopter;
producing electrical energy with the generator unit for supplying a second motor; and
powering a first rotor of the helicopter using the second motor.

11. The method of claim 10, further comprising:
supplying electrical energy to a third motor via the generator unit; and
powering a second rotor of the helicopter with the third motor.

12. The method of claim 10, further comprising: pivoting the second motor along with a main rotor relative to a helicopter cell while the helicopter is in flight.

* * * * *